United States Patent
Hoshi

(10) Patent No.: US 9,634,342 B2
(45) Date of Patent: Apr. 25, 2017

(54) FUEL CELL SYSTEM AND CONTROL METHOD

(71) Applicant: NISSAN MOTOR CO., LTD., Yokohama-shi, Kanagawa (JP)

(72) Inventor: Kiyoshi Hoshi, Fujisawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 72 days.

(21) Appl. No.: 14/432,676

(22) PCT Filed: Sep. 30, 2013

(86) PCT No.: PCT/JP2013/076492
§ 371 (c)(1),
(2) Date: Mar. 31, 2015

(87) PCT Pub. No.: WO2014/054560
PCT Pub. Date: Apr. 10, 2014

(65) Prior Publication Data
US 2015/0280262 A1 Oct. 1, 2015

(30) Foreign Application Priority Data

Oct. 1, 2012 (JP) .................................. 2012-219534

(51) Int. Cl.
*H01M 8/04* (2016.01)
*H01M 8/04858* (2016.01)
(Continued)

(52) U.S. Cl.
CPC ......... *H01M 8/04858* (2013.01); *B60L 1/003* (2013.01); *B60L 1/08* (2013.01); *B60L 11/1803* (2013.01); *B60L 11/1883* (2013.01); *B60L 11/1885* (2013.01); *B60L 11/1887* (2013.01); *B60L 11/1892* (2013.01); *B60L 11/1894* (2013.01); *H01M 8/04029* (2013.01); *H01M 8/0491* (2013.01); *H01M 8/04253* (2013.01); *H01M 8/04268* (2013.01); *H01M 8/04358* (2013.01); *H01M 8/04559* (2013.01); *H01M 8/04604* (2013.01); *H01M 8/04619* (2013.01); *B60L 2210/10* (2013.01);
(Continued)

(58) Field of Classification Search
None
See application file for complete search history.

(56) References Cited

U.S. PATENT DOCUMENTS

| 8,524,406 B2 | 9/2013 | Tanaka et al. |
| 2005/0053809 A1 | 3/2005 | Hayashi et al. |

(Continued)

FOREIGN PATENT DOCUMENTS

| DE | 10 2004 033 169 A1 | 2/2005 |
| JP | 09-231991 A | 9/1997 |

(Continued)

*Primary Examiner* — Patrick Ryan
*Assistant Examiner* — Wyatt McConnell
(74) *Attorney, Agent, or Firm* — Foley & Lardner LLP

(57) ABSTRACT

A fuel cell system estimates a characteristic of an electric power generation of a fuel cell before a supply of an electric power is permitted from the fuel cell to an outside load, restricts or prohibits characteristic of the electric power generation of the fuel cell when a temperature of the fuel cell is equal to or lower than a first prescribed temperature.

9 Claims, 3 Drawing Sheets

(51) Int. Cl.
   *H01M 8/04223*   (2016.01)
   *H01M 8/0432*    (2016.01)
   *H01M 8/04537*   (2016.01)
   *H01M 8/04029*   (2016.01)
   *B60L 1/00*      (2006.01)
   *B60L 1/08*      (2006.01)
   *B60L 11/18*     (2006.01)
   *H01M 8/04828*   (2016.01)

(52) U.S. Cl.
   CPC ..... *B60L 2240/36* (2013.01); *B60L 2240/662* (2013.01); *B60L 2260/44* (2013.01); *H01M 8/04947* (2013.01); *H01M 2250/20* (2013.01); *Y02T 10/7216* (2013.01); *Y02T 10/7291* (2013.01); *Y02T 90/16* (2013.01); *Y02T 90/32* (2013.01); *Y02T 90/34* (2013.01)

(56) References Cited

U.S. PATENT DOCUMENTS

2005/0238934 A1* 10/2005 Takahashi ......... H01M 8/04097
                                                  429/414
2006/0280977 A1  12/2006 Sakajo et al.
2012/0003557 A1   1/2012 Tanaka et al.

FOREIGN PATENT DOCUMENTS

| JP | 2000-357526 A | 12/2000 |
| JP | 2005-353532 A | 12/2005 |
| JP | 2006-351325 A | 12/2006 |
| JP | 2007-194223 A | 8/2007 |
| JP | 2010-186599 A | 8/2010 |
| WO | WO 2004/004035 A2 | 1/2004 |

* cited by examiner

FUEL CELL SYSTEM AND CONTROL METHOD

TECHNICAL FIELD

The present invention relates to a fuel cell system and to a control method.

BACKGROUND ART

It is known that the IV characteristic, which shows characteristic of electric power generation of a fuel cell, changes with temperature of the fuel cell. Accordingly, the IV characteristic of the fuel cell can be obtained by measuring temperature of the fuel cell. However, temperature of the fuel cell changes depending on the position at which the measurement is made as well as on the wet condition thereof; and thus, it is difficult to know accurately the IV characteristic of the fuel cell only by the measured temperature.

In JP2000-357526A, a method is disclosed with which the IV characteristic is estimated based on the detected values of the electric current and voltage of the fuel cell.

In JP2000-357526A, the load to which the electric power is supplied from the fuel cell is controlled thereby changing the electric current taken out from the fuel cell, and the IV characteristic is estimated from the relationship between the voltage of the fuel cell at this time and the electric current taken out therefrom.

SUMMARY OF INVENTION

However, the IV characteristic becomes very bad under the environment of an extremely low temperature. Because of this, when the electric current is taken out from the fuel cell in order to estimate the IV characteristic under the environment of an extremely low temperature, there is a risk of a so-called voltage drop, the phenomenon that the voltage of the fuel cell becomes lower than the minimum voltage.

The present invention was made in order to solve the problem as mentioned above; and therefore, an object of the present invention is to suppress generation of the voltage drop under the environment of an extremely low temperature.

The fuel cell system according to an aspect of the present invention comprises: a fuel cell; an outside load configured to be supply an electric power generated by the fuel cell; a complementary equipment configured be supply the electric power generated by the fuel cell; a first permitting unit configured to permit a supply of the electric power from the fuel cell to the outside load when a characteristic of an electric power generation of the fuel cell becomes a prescribed characteristic; a warm-up operation control unit configured to execute a warm-up operation of the fuel cell by supplying the electric power from the fuel cell to the complementary equipment before a permission is made by the first permitting unit; an estimating unit configured to estimate, while changing an electric current taken out from the fuel cell with a prescribed width by changing a load to the complementary equipment, the characteristic of the electric power generation based on a generated voltage of the fuel cell with this change; a temperature detecting unit configured to detect a temperature of the fuel cell; and a prohibiting unit configured to restrict or prohibit an estimation of the characteristic of the electric power generation by the estimating unit when the temperature of the fuel cell is equal to or lower than a first prescribed temperature.

DESCRIPTION OF EMBODIMENTS

Hereunder, the embodiment of the present invention will be explained by referring to the attached drawings.

Figure 1:
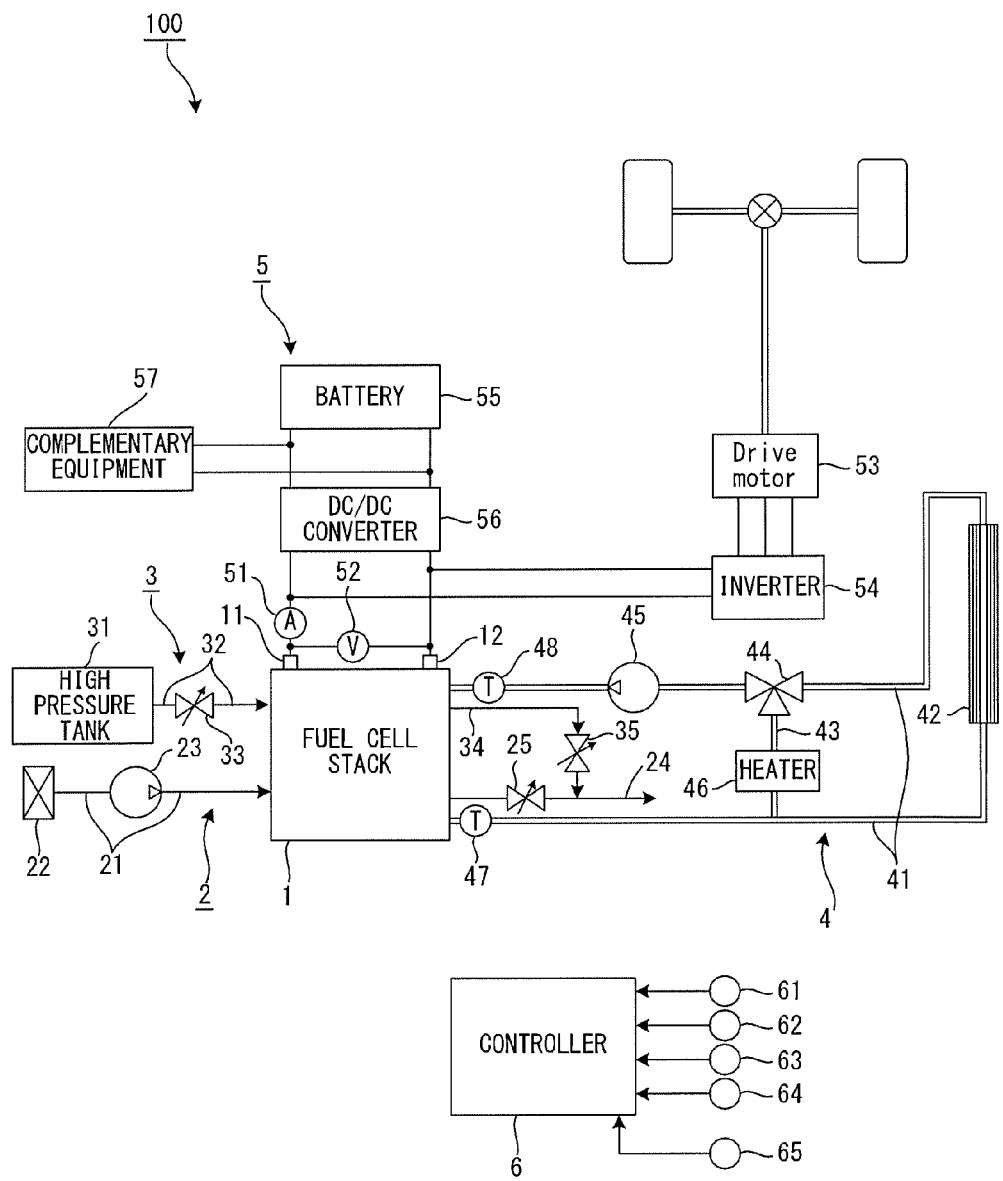
FIG. 1 is a rough configuration diagram of the fuel cell system.

The embodiment of the present invention will be explained by using FIG. 1. FIG. 1 is a rough configuration diagram of a fuel cell system 100.

The fuel cell system 100 comprises a fuel cell stack 1, a cathode gas supplying and emitting equipment 2, a anode gas supplying and emitting equipment 3, a stack cooling equipment 4, the electric power system 5, and a controller 6.

The fuel cell stack 1 is constructed by stacking several hundred sheets of the fuel cell; and it generates an electric power which is necessary to drive a vehicle by receiving an anode gas and a cathode gas which are supplied. The fuel cell stack 1 comprises an anode electrode output terminal 11 and a cathode electrode output terminal 12, the terminals to take out the electric power.

The cathode gas supplying and emitting equipment 2 is the equipment which supplies the cathode gas to the fuel cell stack 1 and also emits the cathode off gas, which is emitted from the fuel cell stack 1, to an outside atmosphere. The cathode gas supplying and emitting equipment 2 comprises a cathode gas supply pass 21, a filter 22, a cathode compressor 23, a cathode gas emission pass 24, and a cathode gas pressure control valve 25.

The cathode gas supply pass 21 is the flow pass through which the cathode gas to be supplied to the fuel cell stack 1 flows. The cathode gas supply pass 21 is connected its one end to a filter 22 and the other end to a cathode gas inlet port of the fuel cell stack 1.

The filter 22 removes foreign matters in the cathode gas which is taken into the cathode gas supply pass 21.

The cathode compressor 23 is installed in the cathode gas supply pass 21. The cathode compressor 23 takes an atmospheric air (outside air) as the cathode gas into the cathode gas supply pass 21 through the filter 22 whereby supplying it to the fuel cell stack 1.

The cathode gas emission pass 24 is a flow pass through which the cathode off gas emitted from the fuel cell stack 1 flows. The cathode gas emission pass 24 is connected its one end to a cathode gas outlet port of the fuel cell stack 1 and the other end is an open end via the cathode gas pressure control valve 25.

Although not shown here, a humidifying equipment may be installed in the cathode gas supply pass 21 in order to humidify the fuel cell stack 1.

The anode gas supplying and emitting equipment 3 is an equipment with the anode gas is supplied to the fuel cell stack 1 and also the anode off gas is emitted from the fuel cell stack 1 to the cathode gas emission pass 24. The anode gas supplying and emitting equipment 3 comprises a high pressure tank 31, an anode gas supply pass 32, a pressure control valve 33, an anode gas emission pass 34, and a purge valve 35.

The high pressure tank 31 stores the anode gas to be supplied to the fuel cell stack 1 under a high pressure state.

The anode gas supply pass 32 is a flow pass through which the anode gas is supplied from the high pressure tank 31 to the fuel cell stack 1. The anode gas supply pass 32 is connected its one end to the high pressure tank 31 and the other end to an anode gas inlet port of the fuel cell stack 1.

The pressure control valve 33 is installed in the anode gas supply pass 32. Opening and closing of the pressure control valve 33 are controlled by the controller 6, whereby controlling the pressure of the anode gas flown out from the high pressure tank 31 to the anode gas supply pass 32 in a desired pressure.

The anode gas emission pass 34 is a flow pass through which the anode off gas emitted from the fuel cell stack 1 flows. The anode gas emission pass 34 is connected its one end to an anode gas outlet port of the fuel cell stack 1 and the other end to the cathode gas emission pass 24.

The purge valve 35 is installed in the anode gas emission pass 34. Opening and closing of the purge valve 35 is controlled by the controller 6, whereby controlling the flow amount of the anode off gas which is emitted from the anode gas emission pass 34 to the cathode gas emission pass 24.

The stack cooling equipment 4 is a equipment with which the fuel cell stack 1 is cooled so that the fuel cell stack 1 may be maintained at a suitable temperature for generation of the electric power. The stack cooling equipment 4 comprises a cooling water circulation pass 41, a radiator 42, a bypass 43, a three-way valve 44, a circulation pump 45, a PTC heater 46, a first water temperature sensor 47, and a second water temperature sensor 48.

The cooling water circulation pass 41 is a pass through which the cooling water to cool the fuel cell stack 1 is circulated.

The radiator 42 is installed in the cooling water circulation pass 41. The radiator 42 cools the cooling water which is emitted from the fuel cell stack 1.

The bypass 43 is connected its one end to the cooling water circulation pass 41 and the other end to the three-way valve 44 so that the cooling water may be circulated with bypassing the radiator 42.

The three-way valve 44 is installed in a downstream side of the radiator 42 in the cooling water circulation pass 41. The three-way valve 44 changes a circulation pass of the cooling water in accordance with the temperature of the cooling water. Specifically, when the temperature of the cooling water is relatively high, the circulation pass of the cooling water is changed such that the cooling water emitted from the fuel cell stack 1 may be supplied again to the fuel cell stack 1 via the radiator 42. On the contrary, when the temperature of the cooling water is relatively low, the circulation pass of the cooling water is changes such that the cooling water emitted from the fuel cell stack 1 may be supplied again to the fuel cell stack 1 through the bypass 43 without going through the radiator 42.

The circulation pump 45 is installed in a downstream side of the three-way valve 44 in the cooling water circulation pass 41 so that the cooling water may be circulated.

The PCT heater 46 is installed in the bypass 43. The PCT heater 46 is electrified during a warm-up operation of the fuel cell stack 1 to raise the temperature of the cooling water.

The first water temperature sensor 47 is installed in an upstream side of the radiator 42 in the cooling water circulation pass 41. The first water temperature sensor 47 detects the temperature of the cooling water which is emitted from the fuel cell stack 1.

The second water temperature sensor 48 is installed between the circulation pump 45 and the fuel cell stack 1 in the cooling water circulation pass 41. The second water temperature sensor 48 detects the temperature of the cooling water which is supplied to the fuel cell stack 1.

The electric power system 5 comprises a electric current sensor 51, a voltage sensor 52, a drive motor 53, an inverter 54, a battery 55, a DC/DC converter 56, and a complementary equipment 57.

The electric current sensor 51 detects an electric current which is take out from the fuel cell stack 1 (hereunder, this is called as "output electric current").

The voltage sensor 52 detects a voltage across the terminals, i.e., a voltage between the anode electrode output terminal 11 and the cathode electrode output terminal 12 (hereunder, this voltage is called as "output voltage").

The drive motor 53 is a three-phase alternating current synchronous motor in which a permanent magnet is buried in a rotor and a stator coil is rolled on a stator. The drive motor 53 has a function as an electrically driven motor which is driven to rotate by receiving the electric powers from the fuel cell stack 1 and the battery 55 as well as a function as a generator of the electric power to generate an electromotive force between both ends of the stator coil during deceleration of a vehicle in which rotor is rotated by an outside force.

The inverter 54 comprises plural semiconductor switches including, for example, IGBT (Insulated Gate Bipolar Transistor). Opening and closing of the semiconductor switch of the inverter 54 are controlled by the controller 6, whereby a direct current power is changed to an alternating current power, or the alternating current power is changed to the direct current power. When the drive motor 53 works with the function as the electrically driven motor, the inverter 54 changes a synthesized direct current power of an output electric power of the fuel cell stack 1 and an output electric power of the battery 55 to a three-phase alternating current power, whereby this power is supplied to the drive motor 53. On the other hand, when the drive motor 53 works with the function as the electric power generator, a regenerative electric power (three-phase alternating current power) is changed to the direct current power, whereby this power is supplied to the battery 55.

The battery 55 is charged with the regenerative electric power of the drive motor 53. The electric power which is charged in the battery 55 is supplied to the complementary equipment 57 and the drive motor 53 as necessary.

The DC/DC converter 56 is a bidirectional voltage converter which raises and lowers an output voltage of the fuel cell stack 1. By controlling the output voltage of the fuel cell stack 1 by means of the DC/DC converter 56, an output electric current of the fuel cell stack 1, therefore a generated electric power (output electric current×output voltage), can be controlled.

The complementary equipment 57 is configured by the cathode compressor 23, the circulation pump 45, the PTC heater 46, and so forth; and this is driven by supply of the electric power from the battery 55 or the fuel cell stack 1.

The controller 6 is configured by a microcomputer which comprises a central calculation unit (CPU), a read only memory (ROM), a random access memory (RAM), and an input output interface (I/O interface). To the controller 6, signals from various sensors are sent in order to control the fuel cell system 100, these sensors including not only the first water temperature sensor 47, the second water temperature sensor 48, the electric current sensor 51, and the voltage sensor 52, but also an outside temperature sensor 61 which detects an outside atmospheric temperature, a key sensor 62 which detects a start-up request and a stop request of the fuel cell system 100 based on On/Off of a start-up key, an acceleration stroke sensor 63 which detects a stroke of an acceleration pedal, a state of charge sensor (SOC sensor) 64 which detects a charge rate of the battery 55 (hereunder, this rate is called as "battery charge rate"), and a battery temperature sensor 65 which detects the temperature of the battery 55.

The controller 6 controls the fuel cell system 100 based on these input signals.

Here, an IV estimation of the fuel cell stack 1 will be explained.

Figure 2:
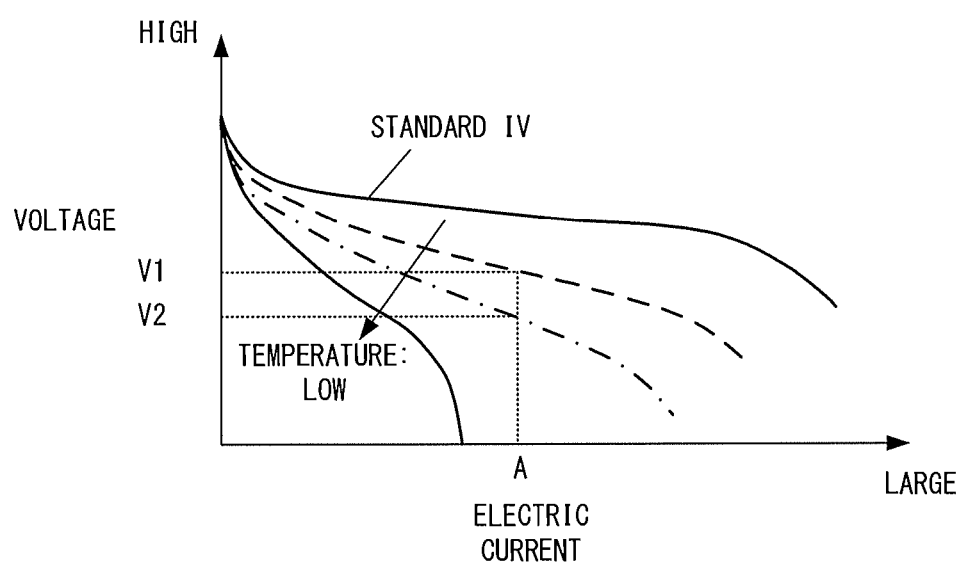
FIG. 2 is a map which shows the IV characteristic of the fuel cell stack.

It is known that in accordance with the temperature of the fuel cell stack 1, the fuel cell stack 1 changes its IV characteristic which shows a characteristic of electric power generation. When the temperature of the fuel cell stack 1 becomes lower, the IV characteristic relative to the standard IV characteristic becomes lower as shown in FIG. 2, whereby the generated electric power of the fuel cell stack 1 becomes lower. Therefore, in the fuel cell system 100, when the temperature of the fuel cell stack 1 is low, supply of the electric power from the fuel cell stack 1 to the drive motor 53 is prohibited whereby prohibiting running of the vehicle until the generated electric power of the fuel cell stack 1 becomes equal to or more than a minimum driving electric power (prescribed characteristic) with which the vehicle can be driven.

In FIG. 2, the output electric current at the time when the generated electric power of the fuel cell stack 1 is equal to the minimum driving electric power is assigned to the electric current A; and the output voltage at the time when the output electric current A is taken out is assigned to the voltage V1.

In FIG. 2, as shown by the dotted line, in the case that the temperature of the fuel cell stack 1 is high, the output voltage of the fuel cell stack 1 at the time when the output electric current A is taken out from the fuel cell stack 1 becomes the voltage V1, so that the minimum driving electric power can be supplied to the drive motor 53 from the fuel cell stack 1; and thus, supply of the electric power from the fuel cell stack 1 to the drive motor 53 is permitted whereby permitting running of the vehicle.

On the other hand, as shown by the dashed line in FIG. 2, in the case that the temperature of the fuel cell stack 1 is low, the output voltage of the fuel cell stack 1 at the time when the output electric current A is taken out from the fuel cell stack 1 becomes the voltage V2, so that the minimum driving electric power cannot be supplied to the drive motor 53 from the fuel cell stack 1; and thus, supply of the electric power from the fuel cell stack 1 to the drive motor 53 is prohibited whereby prohibiting running of the vehicle.

In order to permit running of the vehicle promptly, it is necessary to accurately judge that the generated electric power of the fuel cell stack 1 becomes the minimum driving electric power; and thus, if the temperature of the fuel cell stack 1 can be detected accurately, the generated electric power of the fuel cell stack 1 can be detected accurately from the IV characteristic based on the temperature.

However, because it is necessary to electrically insulate between the fuel cell stack 1 and the temperature sensor, it is difficult to detect the temperature of the fuel cell stack 1 by attaching the temperature sensor directly to the fuel cell stack 1; and therefore in this embodiment, the first water temperature sensor 47 and the second water temperature sensor 48 are installed in the cooling water circulation pass 41. And because the temperature of the fuel cell stack 1 is detected based on the signal from the first water temperature sensor 47 as well as the signal from the second water temperature sensor 48, there may be a possible discrepancy between the actual temperature of the fuel cell stack 1 and the temperatures which are detected by the first water temperature sensor 47 and the second water temperature sensor 48; and thus, the IV characteristic of the fuel cell stack 1 cannot be estimated accurately based on the temperatures detected by the first water temperature sensor 47 and the second water temperature sensor 48.

Accordingly, the IV estimation is made by estimating the IV characteristic of the fuel cell stack 1. In the fuel cell stack 1, it has been known that a relationship between the output electric current I and a difference $\Delta V$ between a standard voltage based on the standard IV and an actual output voltage can be approximated by a linear function as shown by an equation (1) under a condition where an effect of a concentration overvoltage is small.

$$\Delta V = aI + b \quad (1)$$

When the temperature of the fuel cell stack 1 is low and supply of the electric power to the drive motor 53 is prohibited, the generated electric power is supplied from the fuel cell stack 1 to the complementary equipment 57 whose electric power consumption is lower than the drive motor 53, whereby measuring plural output voltages (generated voltage) with changing the output electric current with a prescribed width, so that the values "a" and "b" of the equation (1) are calculated from the output electric current and the output voltage. Then, by using the calculated values "a" and "b", the IV characteristic of the fuel cell stack 1 is estimated. Once the values "a" and "b" are calculated, the output voltage corresponding to the output electric current A when supplying the minimum driving electric power from the fuel cell stack 1 to the drive motor 53 can be obtained; and thus, when the output voltage becomes equal to or more than the voltage V1, it is judged that the fuel cell stack 1 can supply the minimum driving electric power to the drive motor 53. Meanwhile, it is preferable to set the prescribed range widely in order to accurately calculate the values "a" and "b".

As discussed above, even when the temperature of the fuel cell stack 1 is so low that supply of the electric power from the fuel cell stack 1 to the drive motor 53 is prohibited, by executing the IV estimation it can be judged accurately whether or not the electric power can be supplied from the fuel cell stack 1 to the drive motor 53.

However, the IV characteristic becomes very bad at an extremely low temperature; and thus, when the output electric current of the fuel cell stack 1 is changed with the prescribed width in order to execute the IV estimation, generation of the electric power of the fuel cell stack 1 becomes unstable whereby causing the voltage drop, the phenomenon that the output voltage of the fuel cell stack 1 becomes lower than the minimum guaranteed voltage. Here, the minimum guaranteed voltage is the lowest voltage of the output voltage with which the fuel cell stack 1 can work without abnormal slippage of the performance thereof. In the fuel cell system 100, the voltage of each cell of the fuel cell stack 1 should be made not to become lower than a prescribed voltage; and thus, the fuel cell system 100 is constructed so as to be stopped if the output voltage of the fuel cell stack 1 becomes lower than the minimum guaranteed voltage. Therefore, in this embodiment, the start-up control of the fuel cell system 100 is carried out in the way as mentioned below.

Figure 3:
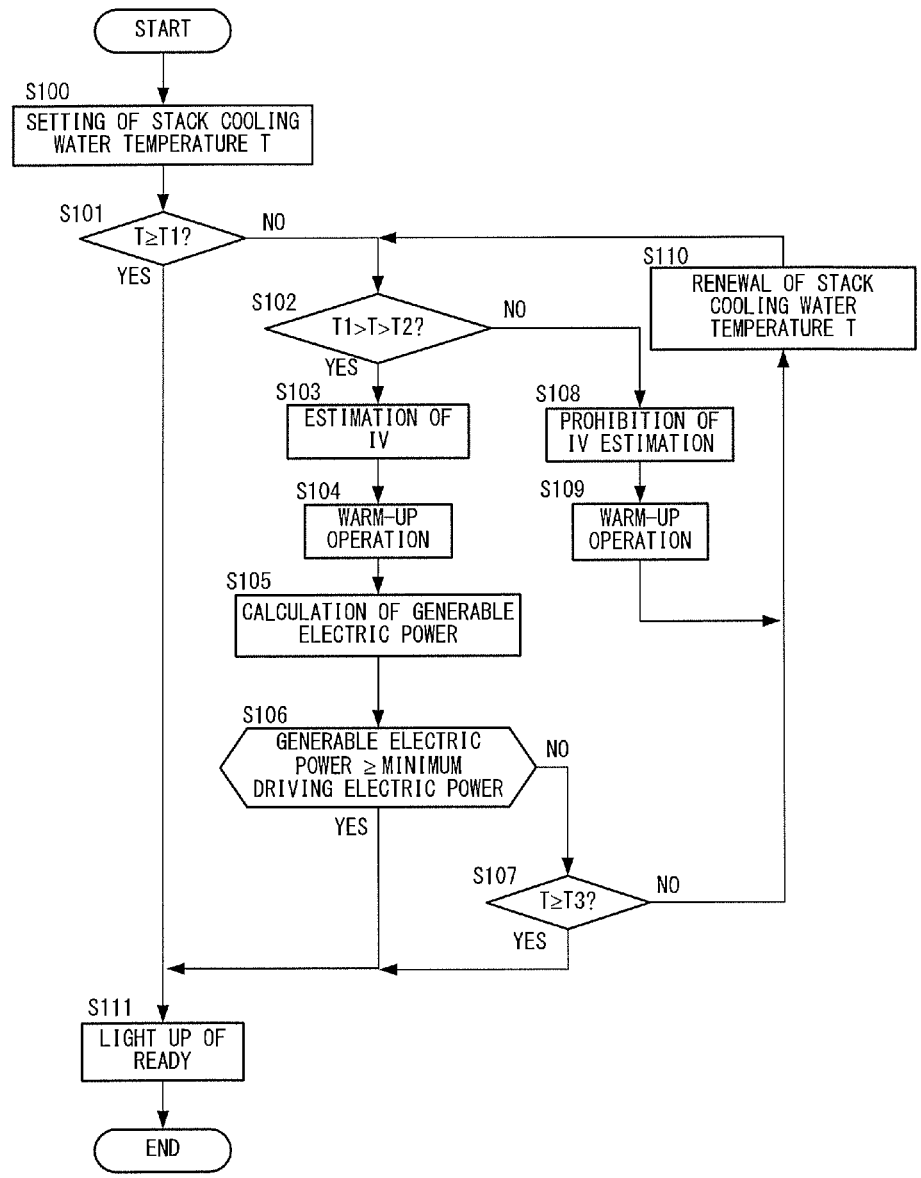
FIG. 3 is a flow chart which explains the start-up control.

Next, the start-up control of this embodiment will be explained by using the flow chart shown in FIG. 3.

In the step S100, the controller 6 detects the temperature of the cooling water which is emitted from the fuel cell stack 1 the first water temperature sensor 47, and also detects the temperature of the cooling water which is supplied to the fuel cell stack 1 the second water temperature sensor 48. Then, the controller 6 sets the lower temperature between them as the stack cooling water temperature T.

In the step S101, the controller 6 compares between the stack cooling water temperature T and an immediate start-up temperature (third prescribed temperature) T1. The immediate start-up temperature T1 is a temperature at which the generated electric power of the fuel cell stack 1 can be judged to be equal to or higher than the minimum driving electric power without fail because the temperature of the fuel cell stack 1 is sufficiently high. The immediate start-up temperature T1 is, for example, 50° C. If the stack cooling water temperature T is equal to or higher than the immediate start-up temperature T1, the process proceeds to the step S111; and if the stack cooling water temperature T is lower than the immediate start-up temperature T1, the process proceeds to the step S102.

In the step S102, the controller 6 compares the immediate start-up temperature T1 and an IV estimation prohibiting temperature T2 with the stack cooling water temperature T. The IV estimation prohibiting temperature T2 (first prescribed temperature) is a temperature at which the voltage of the fuel cell stack 1 becomes lower than the minimum guaranteed voltage when the output electric current of the fuel cell stack 1 is changed with a prescribed width in order to execute the IV estimation. The IV estimation prohibiting temperature T2 is, for example, −35° C. If the stack cooling water temperature T is lower than the immediate start-up temperature T1 and higher than the IV estimation prohibiting temperature T2, the process proceeds to the step S103; and when the stack cooling water temperature T is equal to or lower than the IV estimation prohibiting temperature T2, the process proceeds to the step S108.

In the step S103, the controller 6 executes the IV estimation. Specifically, the controller 6 changes the output electric current of the fuel cell stack 1 with a prescribed width by controlling the electric power consumed by the complementary equipment 57 and the charge and discharge electric power of the battery 55, and whereby detecting the output electric current by the electric current sensor 51 and the output voltage by the voltage sensor 52; and based on the detected output electric current and the detected output voltage, IV estimation is executed.

In the step S104, the controller 6 executes the warm-up operation. Specifically, the controller 6 directs the fuel cell stack 1 to increase generation of the electric power to above an operation point at which the fuel cell system 100 operates with a maximum efficiency under a normal operation thereby increasing a self-generated heat by power generation to carry out the warm-up operation. The generated electric power by the fuel cell stack 1 is consumed by the complementary equipment 57; and an energy balance of the fuel cell system 100 is held by adjusting the electric powers consumed by the PTC heater 46 and the cathode compressor 23 and the electric power charged to the battery 55. The PTC heater 46, which is the complementary equipment 57, not only consumes the electric power which is generated by the fuel cell stack 1 but also warms-up the cooling water by the self-generated heat, so that warm-up of the fuel cell stack 1 can be further facilitated by circulating the warmed-up cooling water to the fuel cell stack 1. Meanwhile, the fuel cell stack 1 is warmed-up also by a heat which is generated by generation of the electric power.

In the step S105, the controller 6 calculates, from the IV characteristic which is estimated by the IV estimation, the output voltage at the time when the output electric current corresponding to the minimum driving electric power is taken out from the fuel cell stack 1, thereby calculating a presently generable electric power from these values.

In the step S106, the controller 6 compares the generable electric power with the minimum driving electric power. When the generable electric power is equal to or more than the minimum driving electric power, the process proceeds to the step S111; and when the generable electric power is less than the minimum driving electric power, the process proceeds to the step S107.

In the step S107, the controller 6 compares the stack cooling water temperature T with a warm-up termination temperature T3 (second prescribed temperature). The warm-up termination temperature T3 is lower than the immediate start-up temperature T1 and higher than 0° C.; therefore, for example, 10° C. The warm-up termination temperature T3 is a temperature at which it can be judged that warm-up of the fuel cell stack 1 progresses to the point when the generable electric power of the fuel cell stack 1 becomes equal to or more than the minimum driving electric power. The controller 6 judges that the warm-up of the fuel cell stack 1 is over when the stack cooling water temperature T becomes equal to or higher than the warm-up termination temperature T3, even if the IV estimation cannot be made accurately, for example, because of a problem of the voltage sensor 52 and so forth. When the stack cooling water temperature T is equal to or higher than the warm-up termination temperature T3, the process proceeds to the step S111; and when the stack cooling water temperature T is lower than the warm-up termination temperature T3, the process proceeds to the step S110.

In the step S102, if it is judged that the stack cooling water temperature T is lower than the IV estimation prohibiting temperature T2, the controller 6 prohibits the IV estimation in the step S108. By so doing, when the temperature of the fuel cell stack 1 is extremely low, the IV estimation is prohibited thereby suppressing the situation that the output voltage of the fuel cell stack 1 becomes lower than the minimum guaranteed voltage, so that the voltage drop can be suppressed, and thus the stop of the fuel cell system 100 can be suppressed.

In the step S109, the controller 6 executes the warm-up operation. Specifically, similarly to the step S104, the controller 6 warms up the fuel cell stack 1; in this step, however, the electric power which is supplied to the complementary equipment 57 is set high so far as the output voltage of the fuel cell stack 1 does not become lower than the minimum guaranteed voltage.

In the step S110, the controller 6 detects the temperature of the cooling water which is emitted from the fuel cell stack 1 by the first water temperature sensor 47 and the temperature of the cooling water which flows into the fuel cell stack 1 by the second water temperature sensor 48. Then, the controller 6 renews the stack cooling water temperature T with the lower temperature. Then, the process returns to the step S102; and in the processes thereafter, the stack cooling water temperature T which is renewed in the step S110 is used.

In the step S111, a READY lamp is lighted up, whereby permitting the fuel cell stack 1 to supply the electric power to the drive motor 53.

The effects of the embodiment of the present invention will be explained.

In the fuel cell system 100, wherein the electric power which is consumed by the complementary equipment 57 is changed before permitting the supply of the electric power to the drive motor 53, thereby changing the output electric current of the fuel cell stack 1 with a prescribed width, and whereby executing the IV estimation based on the output electric current and the output voltage, lowering of the voltage of the fuel cell stack 1 beyond the minimum guaranteed voltage can be suppressed, and thus, generation of the voltage drop can be suppressed; these phenomena being caused by prohibiting the IV estimation if the stack cooling water temperature T is equal to or lower than the IV estimation prohibiting temperature T2 thereby leading to unstable generation of the electric power of the fuel cell stack 1 wherein this instability is caused by the change of the output electric current with a prescribed width.

When the stack cooling water temperature T is equal to or higher than the warm-up termination temperature T3, supply of the electric power from the fuel cell stack 1 to the drive motor 53 is permitted. In this way, even if the IV estimation cannot be executed accurately, the electric power can be supplied from the fuel cell stack 1 to the drive motor 53.

When the stack cooling water temperature T is equal to or higher than the immediate start-up temperature T1, supply of the electric power from the fuel cell stack 1 to the drive motor 53 is permitted. In this way, if the temperature of the fuel cell stack 1 is sufficiently high, the electric power can be supplied promptly from the fuel cell stack 1 to the drive motor 53 without executing the IV estimation and the warm-up operation.

In the above, the embodiment of the present invention has been explained; however, the embodiment mentioned above is only a part of the application examples of the present invention, so that there is no intention to limit the technical scope of the present invention to the specific composition of the above-mentioned embodiment.

The above-mentioned embodiment is based on the assumed state that when the electric current generated by the fuel cell stack 1 is increased by the request from the IV estimation the IV characteristic is so low as it is lowered to the minimum guaranteed voltage; and therefore, even if the IV estimation can be made, because it is apparently in the state that supply of the electric power to the drive motor 53 cannot be permitted, the IV estimation is prohibited; however, the prescribed width of the change of the output electric current may be secured by narrowing the prescribed width of the change of the output electric current of the fuel cell stack 1 or by lowering the output electric current of the fuel cell stack 1. Alternatively, the IV estimation may be restricted in the way as mentioned above. Here, in the case that the output electric current of the fuel cell stack 1 is changed without changing the operation point of the complementary equipment 57, the deficient electric power is discharged from the battery 55; and thus, it must be executed with considering the discharge capacity of the battery 55. In this way too, lowering of the voltage of the fuel cell stack 1 beyond the minimum guaranteed voltage can be suppressed, so that generation of the voltage drop can be suppressed.

In the above-mentioned embodiment, supply of the electric power from the fuel cell stack 1 to the drive motor 53 is permitted when the stack cooling water temperature T becomes equal to or higher than the warm-up termination temperature T3; however, in this case, due to the heat capacity and the difference in the heat radiation characteristics there is a temperature difference between the temperature inside the fuel cell stack 1 and the start-up temperature obtained by the first water temperature sensor 47 and the second water temperature sensor 48, so that there may be the case that the temperature inside the fuel cell stack 1 cannot be detected precisely by the first water temperature sensor 47 and the second water temperature sensor 48. Therefore, in order to judge that the cooling water inside the fuel cell stack 1 reaches the first water temperature sensor 47 thereby the situation is established that the temperature inside the fuel cell stack 1 can be detected by the first water temperature sensor 47, if a third permission unit to validate a second permitting unit is set, this permission being made by judgment that an accumulated value of the flow amount of the cooling water which is circulated through the fuel cell stack 1 by the circulation pump 45 since the start of the start-up control reaches equal to or more than a prescribed amount, supply of the electric power from the fuel cell stack 1 to the drive motor 53 can be permitted more accurately. The prescribed amount is the amount which is determined in advance; and specifically, it is the volume of the cooling water from the fuel cell stack 1 to the first water temperature sensor 47. Alternatively, the second permitting unit may be validated when the elapsed time since start-up of the circulation pump 45 becomes equal to or more than a prescribed time. The prescribed time is the time which is determined in advance; and specifically, it is the time when the accumulated value of the volume of the cooling water which passes the first water temperature sensor 47 becomes equal to or more than the volume of the cooling water from the fuel cell stack 1 to the first water temperature sensor 47. Even if the IV estimation cannot be made precisely, the electric power can be supplied from the fuel cell stack 1 to the drive motor 53 by the ways as mentioned above.

The present application claims the priority right based on the Japanese Patent Application No. 2012-219534 which was filed to the Japan Patent Office on Oct. 1, 2012; and all the contents in the said application is incorporated into the present description by referring to it.

The invention claimed is:

1. A fuel cell system comprising:
   a fuel cell,
   an outside load configured to be supplied with an electric power generated by the fuel cell,
   a complementary equipment configured to be supplied with the electric power generated by the fuel cell,
   a first permitting unit configured to permit a supply of the electric power from the fuel cell to the outside load when a characteristic of an electric power generation of the fuel cell becomes a prescribed characteristic,
   a warm-up operation control unit configured to execute a warm-up operation of the fuel cell by supplying the electric power from the fuel cell to the complementary equipment before a permission is made by the first permitting unit,
   an estimating unit configured to estimate, while changing an electric current taken out from the fuel cell such that an amount of a current value change is a predetermined value by changing a load to the complementary equipment, the characteristic of the electric power generation based on a generated voltage of the fuel cell with this change,
   a temperature detecting unit configured to detect a temperature of the fuel cell, and
   a prohibiting unit configured to restrict or prohibit an estimation of the characteristic of the electric power generation by the estimating unit when the temperature of the fuel cell is equal to or lower than a first prescribed temperature.

2. The fuel cell system according to claim 1, wherein the first prescribed temperature is a temperature at which a voltage of the fuel cell becomes lower than a minimum guaranteed voltage of the fuel cell when the electric current taken out from the fuel cell is changed such that the amount of the current value change is the predetermined value by changing the load to the complementary equipment.

3. The fuel cell system according to claim 1, wherein the temperature detecting unit is a water temperature sensor to detect temperature of cooling water of the fuel cell.

4. The fuel cell system according to claim 1, further comprising
besides the first permitting unit, a second permitting unit configured to permit the supply of the electric power from the fuel cell to the outside load when the temperature of the fuel cell is equal to or higher than a second prescribed temperature which is 0° C. or higher.

5. The fuel cell system according to claim 4, further comprising
a pump configured to circulate a cooling water to the fuel cell, and
besides the first permitting unit and the second permitting unit, a third permitting unit configured to permit the supply of the electric power from the fuel cell to the outside load when an accumulated value of a flow amount by the pump is equal to or more than a prescribed amount.

6. The fuel cell system according to claim 4, further comprising
a pump configured to circulate a cooling water to the fuel cell, and
besides the first permitting unit and the second permitting unit, a third permitting unit configured to permit the supply of the electric power from the fuel cell to the outside load when a time from a start-up of the pump is equal to or more than a prescribed time.

7. The fuel cell system according to claim 2, wherein the first permitting unit is configured to permit the supply of the electric power from the fuel cell to the outside load when the temperature of the fuel cell at the time when the fuel cell starts a generation of the electric power is equal to or higher than a third prescribed temperature which is higher than the first prescribed temperature.

8. A control method to control a fuel cell system including:
a fuel cell,
an outside load to which an electric power generated by the fuel cell is supplied, and
a complementary equipment to which the electric power generated by the fuel cell is supplied,
the control method comprising:
permitting supply of the electric power from the fuel cell to the outside load when a characteristic of an electric power generation of the fuel cell becomes a prescribed characteristic,
executing a warm-up operation of the fuel cell by supplying the electric power from the fuel cell to the complementary equipment before a permission is made,
while changing an electric current taken out from the fuel cell such that an amount of a current value change is a predetermined value by changing a load to the complementary equipment, estimating the characteristic of the electric power generation based on a generated voltage of the fuel cell with this change,
detecting a temperature of the fuel cell, and
when the temperature of the fuel cell is equal to or lower than a first prescribed temperature, restricting or prohibiting an estimation of the characteristic of the electric power generation.

9. A fuel cell system comprising:
a fuel cell,
an outside load configured to be supplied with an electric power generated by the fuel cell,
a complementary equipment configured to be supplied with the electric power generated by the fuel cell,
first permitting means for permitting a supply of the electric power from the fuel cell to the outside load when a characteristic of an electric power generation of the fuel cell becomes a prescribed characteristic,
warm-up operation control means for executing a warm-up operation of the fuel cell by supplying the electric power from the fuel cell to the complementary equipment before a permission is made by the first permitting means,
estimating means for estimating, while changing an electric current taken out from the fuel cell such that an amount of a current value change is a predetermined value by changing a load to the complementary equipment, the characteristic of the electric power generation based on a generated voltage of the fuel cell with this change,
temperature detecting means for detecting a temperature of the fuel cell, and
prohibiting means for restricting or prohibiting an estimation of the characteristic of the electric power generation by the estimating means when the temperature of the fuel cell is equal to or lower than a first prescribed temperature.

* * * * *